US008228553B2

(12) United States Patent
Sakuramata

(10) Patent No.: US 8,228,553 B2
(45) Date of Patent: Jul. 24, 2012

(54) IMAGE PROCESSING APPARATUS, IMAGE PROCESSING METHOD, AND COMPUTER PROGRAM PRODUCT

(75) Inventor: Yoshifumi Sakuramata, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 787 days.

(21) Appl. No.: 12/364,539

(22) Filed: Feb. 3, 2009

(65) Prior Publication Data
US 2009/0237736 A1    Sep. 24, 2009

(30) Foreign Application Priority Data
Mar. 18, 2008    (JP) .................................. 2008-069153

(51) Int. Cl.
   G06F 15/00    (2006.01)
   G06F 7/00     (2006.01)
   G06K 15/00    (2006.01)
(52) U.S. Cl. ......... 358/1.5; 358/448; 358/1.18; 707/695
(58) Field of Classification Search .................. 358/1.18, 358/1.6, 2.1, 3.27, 448; 707/695, 696, 699, 707/706; 715/514, 764, 255, 229, 730; 714/710; 705/14.52
See application file for complete search history.

(56) References Cited

U.S. PATENT DOCUMENTS

| | | | | |
|---|---|---|---|---|
| 7,472,254 B2 * | 12/2008 | Collins | ......................... | 711/220 |
| 2003/0167443 A1 * | 9/2003 | Meunier et al. | ............... | 715/511 |
| 2005/0080823 A1 * | 4/2005 | Collins | ........................ | 707/200 |
| 2005/0216788 A1 * | 9/2005 | Mani-Meitav et al. | ........... | 714/6 |
| 2006/0195486 A1 * | 8/2006 | Ohno et al. | .................... | 707/200 |
| 2007/0083722 A1 * | 4/2007 | Per et al. | ........................ | 711/162 |
| 2007/0182998 A1 * | 8/2007 | Okada | ......................... | 358/400 |
| 2009/0195817 A1 * | 8/2009 | Nakajima | .................... | 358/1.15 |
| 2009/0290189 A1 * | 11/2009 | Izu et al. | ..................... | 358/1.15 |

* cited by examiner

Primary Examiner — Jerome Grant, II
(74) Attorney, Agent, or Firm — Oblon, Spivak, McClelland, Maier & Neustadt, L.L.P.

(57) ABSTRACT

An image processing apparatus including an image retrieving unit that retrieves image information of a revision document, which includes revision information having area definitions and position numbers corresponding to each of the area definitions. The apparatus also includes a re-positioning instruction image retrieving unit that retrieves image information of a re-position instruction sheet, which includes the position numbers in locations different from the locations of the area definitions corresponding to each of the position numbers of the revision document. A position number recognizing unit is also provided, which recognizes the position numbers in the re-positioning instruction image as re-positioning instructions. A re-positioning unit of the image processing apparatus then re-position each of the area definitions of the revision document based on the repositioning instructions recognized by the position number recognizing unit.

4 Claims, 7 Drawing Sheets

ORIGINAL DOCUMENT 1    ORIGINAL DOCUMENT 2

RE-POSITIONING
INSTRUCTION SHEET 1

RE-POSITIONING
INSTRUCTION SHEET 2

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-069153 filed Mar. 18, 2008.

BACKGROUND OF THE INVENTION

1. Field of the Invention

The present invention relates to an image processing apparatus, an image processing method and computer program product for the image processing apparatus.

2. Description of the Related Art

Generally, a procedure of proof-reading the contents of an electronic document prepared by using a personal computer or the like is usually carried out via a display of the personal computer or the like. By proof-reading an electronic document, the electronic document may be modified for the time being. However, proof-reading an electronic document in this manner may result in difficulty in capturing an entire view of the document, and hence it is sometimes necessary to make modifications a number of times.

Under the circumstances, the electronic document prepared with a personal computer or the like has been printed on paper to view the entire modification or layout. This is because printing the electronic document on paper is convenient for capturing the entire document. In this case, editing is performed on the paper document that is a printout of the electronic document, and then the edited paper document is physically reflected to the electronic document via the display of the personal computer or the like.

Some measures have been taken recently to facilitate the procedure mentioned above. For example, Japanese Patent Laid-Open Publication No. 2006-020144 describes an apparatus which is adapted to reflect handwritten information on paper document to an electronic document, using a scanner or a special pen-type device.

Another development has been made to provide an apparatus which enables modification, movement and the like with the handwriting modification on a paper document.

Specifically, editing instructions may be handwritten on a paper document that is a printout of an electronic document to perform operations of modification, movement and the like, using the apparatus disclosed in Japanese Patent Laid-Open Publication No. 2006-020144. However, when editing instructions are handwritten on a paper document that is a printout of an electronic document, a problem of difficulty is raised in specifying the document bridging multiple pages.

SUMMARY OF THE INVENTION

It is an object of the present invention to at least partially solve the problems in the conventional technology.

According to an aspect of the present invention, there is provided an image processing apparatus including an image retrieving unit that retrieves image information of a revision document, which includes revision information having area definitions and position numbers corresponding to each of the area definitions. The apparatus also includes a re-positioning instruction image retrieving unit that retrieves image information of a re-position instruction sheet, which includes the position numbers in locations different from the locations of the area definitions corresponding to each of the position numbers of the revision document. A position number recognizing unit is also provided, which recognizes the position numbers in the re-positioning instruction image as re-positioning instructions. A re-positioning unit of the image processing apparatus then re-position each of the area definitions of the revision document based on the repositioning instructions recognized by the position number recognizing unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below in detail with reference to the accompanying drawings.

Figure 1:
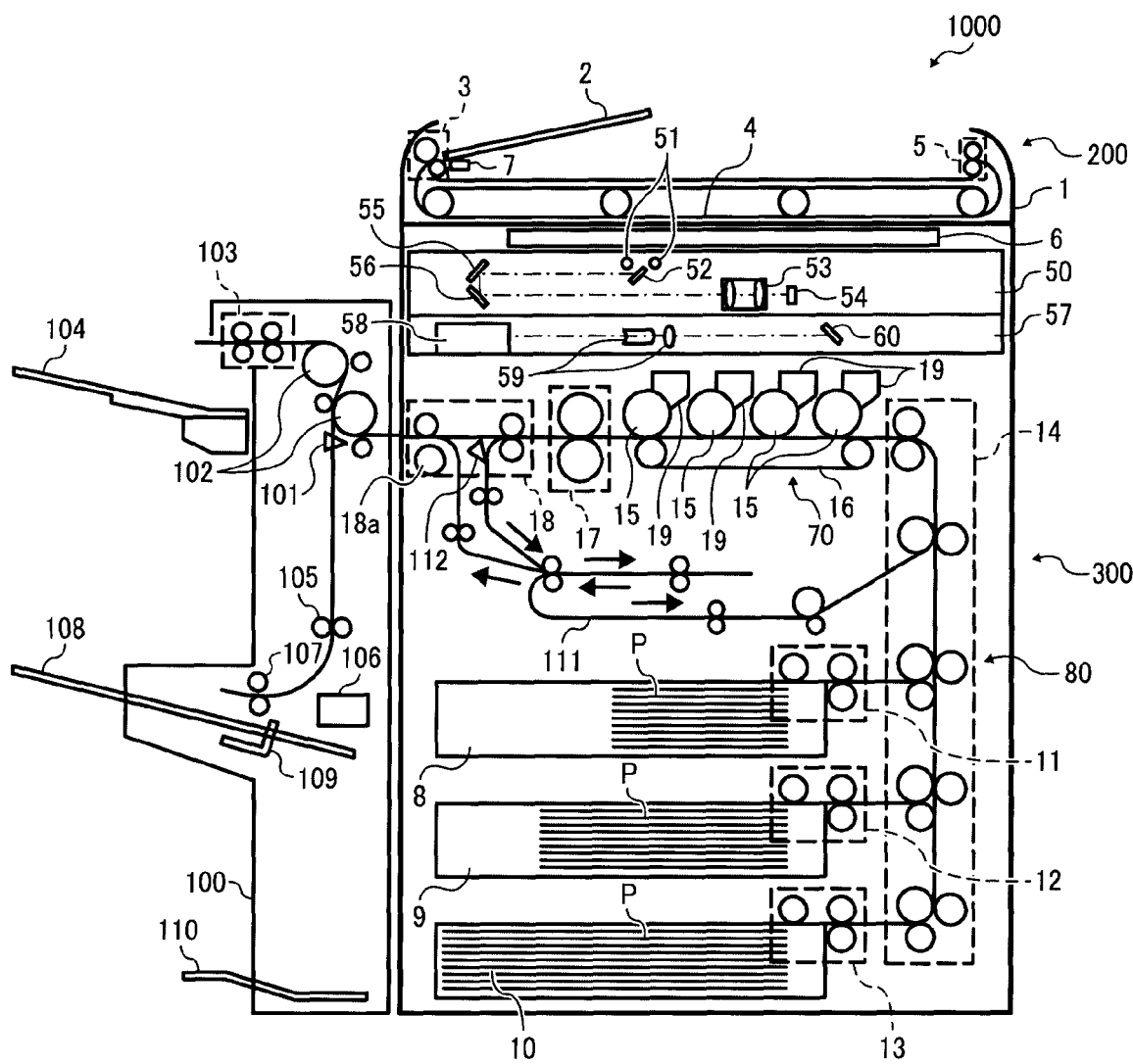
FIG. 1 is a schematic diagram illustrating a digital multifunction machine according to an embodiment of the present invention.
Figure 2:
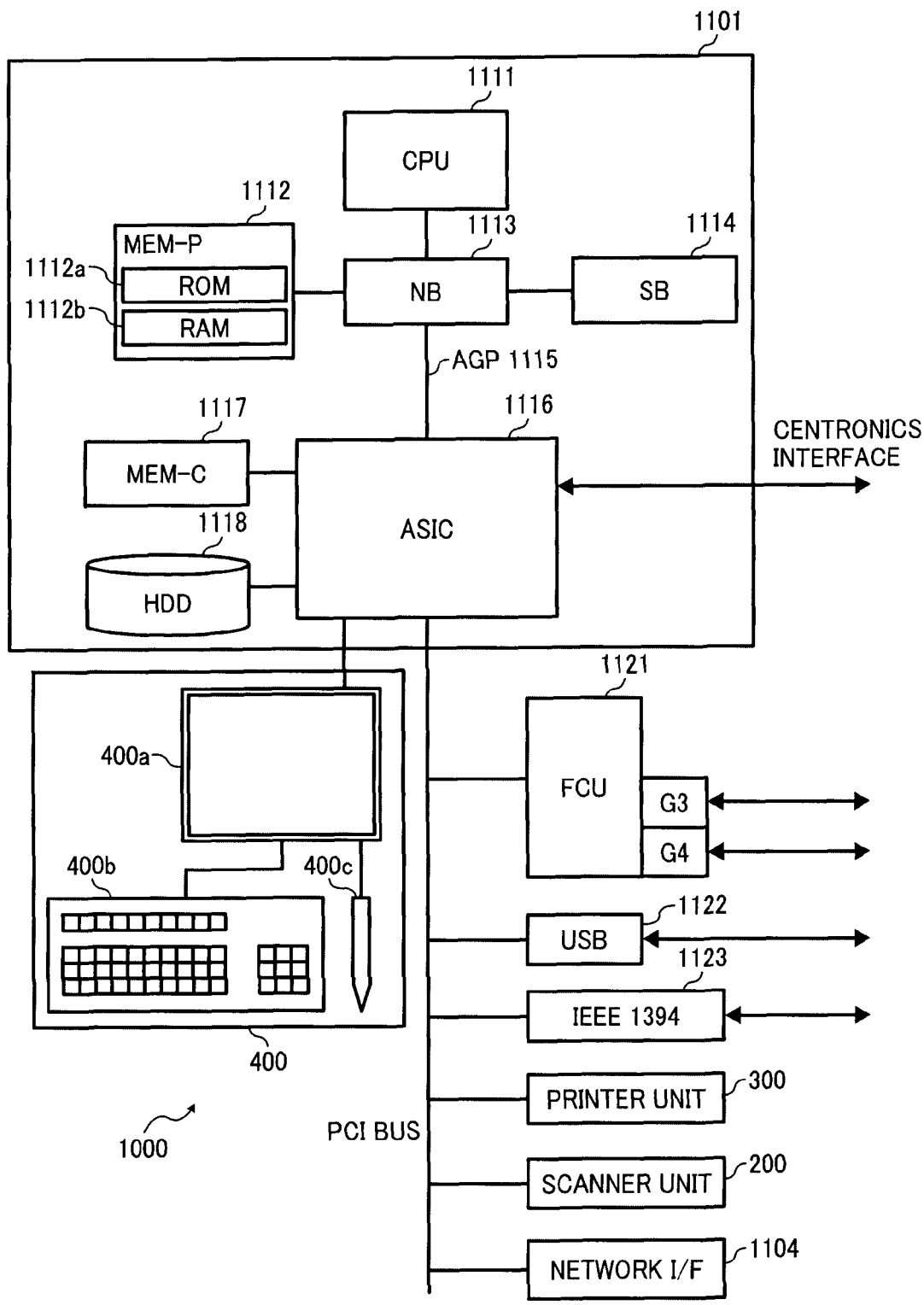
FIG. 2 is a block diagram illustrating a hardware configuration of the digital multifunction machine.

A configuration of and operations performed by the color digital multifunction product 1000 according to the embodiment are described based on FIGS. 1 and 2. The embodiments use the color digital multifunction product, as an example, generally called a multifunction peripheral (MFP) with multi functions such as a copy function, a facsimile (FAX) function, a print function, a scan function, and a delivery function that delivers input images (original images scanned by the scan function, or input images input by the printer or the FAX function).

FIG. 1 is a schematic diagram of the color digital multifunction product 1000. The color digital multifunction product 1000 includes a finisher 100 that is a post processing apparatus, a scanner unit 200 that is an image scanning apparatus, and a printing unit 300 that is an image printing apparatus.

The color digital multifunction product 1000 makes it possible to select an original box function, a copy function, a print function, and a facsimile function by sequentially switching an application switching key in an operation displaying unit 400 (see FIG. 2).

When selecting the original box function, an original box mode is set, when selecting the copy function, a copy mode is set, when selecting the print function, a print mode is set, and when selecting the facsimile function, a facsimile mode is set. An image forming flow in the copy mode is described with reference to FIG. 1 as an example.

At first, the scanner unit 200 is described. The scanner unit 200 includes an auto document feeder (ADF) 1 and a scanning unit 50.

A stack of originals is placed with the image side up on an original sheet tray 2 of the ADF 1. When a print key (not shown) on the operation displaying unit 400 is pressed by a user, a feeding roller 3 and a feeding belt 4 feed the lowest original from the stack onto a predetermined position on a contact glass 6. The color digital multifunction product 1000 has a count function that counts up the number of originals each time an original is fed to a predetermined position on the contact glass 6.

Then, the scanning unit 50 scans the image data of the original fed onto the predetermined position on the contact glass 6.

The scanning unit 50 includes the contact glass 6 and an optical scanning system. The optical scanning system includes exposure lamps 51 that function as illuminating units, a first mirror 52, a lens unit 53, and a charge coupled device (CCD) image sensor 54. The exposure lamps 51 and the first mirror 52 are installed on a first carriage (not shown), and a second mirror 55 and a third mirror 56 are installed on a second carriage (not shown). A scanner drive motor (not shown) drives the optical scanning system. The scanning unit 50 provides a process in which an original is scanned by the exposure lamps 51 and by traveling bodies, the first and the second carriages, moving and scanning to a right direction with a scanner driving motor when the original is placed on the contact glass 6. In another process, an original that the ADF 1 is transporting is scanned by the exposure lamps 51 while the first and the second carriages are halted. Any of the processes is selectable. In a scan process that an original is scanned by the first carriage and the second carriages moved to the right direction with the scanner driving motor, the first carriage and the second carriage are mechanically scanned in a subscanning direction with a relative velocity of the first carriage and the second carriage in a ratio of 2 to 1 to keep a light path length constant when an original image is scanned. The CCD image sensor 54 collects light reflected from the original image, converts the light into an electrical signal, and outputs the signal, which is analog signal. An analog to digital (AD) converter (not shown) converts the signal output from the CCD image sensor 54 into digital data (image data).

The digital data is used in various manners as information for each scanner unit 200. For example, the digital data is sent to the printing unit 300 for printing on a printing medium, or the digital data is sent to a storage apparatus (such as a hard disk drive (HDD) 1118 in FIG. 2) for storing. In an original box mode, the original image information stored in the storage apparatus (such as the HDD 1118) can be used for repeated output or other processes. Such original box function can realize paperless environment as well as improve the operating efficiency.

Once the original is scanned, the feeding belt 4 and a discharging roller 5 discharge it outside of the color digital multifunction product 1000.

If an original set detector 7 detects next original on the original sheet tray 2, the next original is fed onto the contact glass 6 in the same manner of the previous original.

The feeding motor drives each of the feeding roller 3, the feeding belt 4, and the discharging roller 5.

The printing unit 300 is described next. The printing unit 300 includes an image forming station 70, a fixing unit 17, a paper feeding unit 80, and a both-sided paper feeding unit 111.

The image forming station 70 forms images by an electrophotographic process. The image forming station 70 includes a writing unit 57, photosensitive bodies 15 of a tandem type with 4 drums, and developing units 19, which are set on each of the photosensitive bodies, correspond to cyan(C), magenta (M), yellow(Y), and black(B), and a transporting belt 16, in the shape like a belt, that transports the sheet so that images formed on the photosensitive body 15 can be sequentially transferred on a print sheet P at each transferring position.

The paper feeding unit 80 includes a first tray 8, a second tray 9, a third tray 10, a first paper feeding apparatus 11, a second paper feeding apparatus 12, a third paper feeding apparatus 13, and a vertical transporting unit 14. The first paper feeding apparatus 11, the second paper feeding apparatus 12, and the third paper feeding apparatus 13 feed print sheets P loaded in the first tray 8, the second tray 9, and the third tray 10, respectively and the vertical transporting unit 14 transports them to a position where the print sheet abuts on the photosensitive body 15 positioned in the upstream side of a transporting direction.

A laser beam emitted from the writing unit 57 writes the image data scanned by the scanning unit 50 in each photosensitive body 15. The passage through each developing unit 19 of the image data forms a toner image. The writing unit 57 includes a laser emitting unit 58, image formation lenses 59, and a mirror 60. The laser emitting unit 58 includes therein a laser diode of a laser light source and a polygon mirror that rotates at a high velocity with a motor. In addition, although not shown in FIG. 2, a beam sensor that generates main scanning synchronized signals is configured on a position on which a laser beam is irradiated near one end of each photosensitive body 15.

Each toner image on each photosensitive body 15 is transferred on the print sheet P that is transported by the transporting belt 16 with the velocity equal to the rotation of each photosensitive body 15 and a color image is formed on the print sheet P. Then, after the print sheet P is transported to the fixing unit 17 and the image is fixed thereon, a paper-discharging unit 18 discharges it to the finisher 100 of a post processing apparatus.

The finisher 100 can guide the print sheet P transported by a paper-discharging roller 18*a* in the paper-discharging unit 18 by switching from a regular paper-discharging roller 102 direction to a staple processing unit direction. More particularly, the finisher 100 can discharge the print sheet P to the regular paper-discharging tray 104 through the transporting roller 103 by switching a switching board 101 upward and can transport the print sheet P to a staple table 108 through transporting rollers 105 and 107 by switching the switching board 101 downward.

A jogger 109, which aligns paper sheets, aligns the end of loaded print sheets P on the staple table 108 each time when a sheet is discharged and a stapler 106 staples the sheets when copying of a set of sheets is completed. The group of the print sheets P, which sets have been stapled with the stapler 106, are placed by self-weight in a staple completion paper-discharging tray 110.

The regular paper-discharging tray 104 in the finisher 100 is a paper-discharging tray that is movable back and forth. The movable paper-discharging tray 104 sorts copied sheets simply discharged by moving back and forth for every original or every copy set sorted by an image memory.

The color digital multifunction product 1000 can form images on both sides of a print sheet P. When forming images on the both sides of a print sheet P, without guiding the print sheet P fed from each paper feeding tray 8, 9, or 10 to the paper-discharging tray 104 direction, the print sheet P is once stocked in the both-sided paper feeding unit 111 by setting a branch claw 112 upward to change the path of the paper-discharging unit 18. Then, a print sheet P stocked in the both-sided paper feeding unit 111 is again fed in a reversed state from the both-sided paper feeding unit 111 for toner images to be transferred thereon, the toner images being formed again on the photosensitive body 15. Further, the print sheet P is guided to the paper-discharging tray 104 through the branch claw 112 set downward. Thus, the both-sided paper feeding unit 111 is used when images are formed on the both sides of a print sheet P. The both-sided paper feeding unit 111 can be also used to reverse a print sheet P from the front side, on which an image has been copied, when the back side is copied thereon.

FIG. 2 is a block diagram of a hardware configuration of the color digital multifunction product 1000. The color digital multifunction product 1000 as shown in FIG. 2 has a structure that a controller 1101, the printing unit 300, and the scanner unit 200 are connected through a peripheral component interconnect (PCI) bus. The controller 1101 controls the entire color digital multifunction product 1000. Specifically, the controller 1101 controls an input from the operation displaying unit 400, image formation operation, and communications. The printing unit 300 or the scanner unit 200 includes an image processing unit that performs processing such as error diffusion and gamma conversion.

The operation displaying unit 400 has a touch-panel 400a which displays the original image information etc. of the original document read in the scanner unit 200, a stylus-pen 400c as a hand input unit which can perform the operation same with having pushed the button of a mouse by contacting the tip of a pen to touch-panel 400a, a keyboard 400b which receives character input, a compilation operation, etc. of a user by the touch of a key. In addition, when a display unit to display an original image information etc. is not a touch panel, a character etc. can also be input by operating operation units, such as a mouse, and moving the cursor on a screen. A direct input operation could also be carried out to the touch-panel 400a with the indication with a user's finger etc., without using the stylus-pen 400c.

The controller 1101 includes a central processing unit (CPU) 1111, which is a main processing unit of a computer, a system memory (MEM-P) 1112, a north bridge (NB) 1113, a south bridge (SB) 1114, an application specific integrated circuit (ASIC) 1116, a local memory (MEM-C) 1117, and a hard disk drive (HDD) 1118. An accelerated graphics port (AGP) bus 1115 connects the NB 1113 and the ASIC 1116. The MEM-P 1112 further includes a read only memory (ROM) 1112a and a random access memory (RAM) 1112b.

The CPU 1111 controls the operation of the entire digital multifunction product 1000. The CPU 1111 includes chip-sets comprised of the NB 1113, the MEM-P 1112, and the SB 1114, and it is connected to other apparatuses through the chip-sets.

The NB 1113 is a bridge to connect the CPU 1111 to the MEM-P 1112, the SB 1114, and the AGP bus 1115. The NB 1113 includes a memory controller (not shown) that controls writing to and reading from the MEM-P 1112, a PCI master, and an AGP target.

The MEM-P 1112 includes the ROM 1112a and the RAM 1112b. The MEM-P 1112 functions as a system memory that is used as a storage memory for computer programs and data, a developing memory for computer programs and data, an image forming memory for printers, and the like. The ROM 1112a functions as a read only memory that is used as a storage memory for data and computer programs for controlling operations of the CPU 1111. The RAM 1112b is a writable and readable memory and it is used as a developing memory for computer programs and data, an image forming memory for printers, and the like.

The SB 1114 is a bridge to connect the NB 1113 to PCI devices and peripheral devices. The SB 1114 is connected to the NB 1113 through the PCI bus. Moreover, a network interface (I/F) unit 1104 and the like are connected to this PCI bus.

The ASIC 1116 is an integrated circuit (IC) for processing images, the IC having hardware components of processing images, and functions as a bridge that connects the AGP bus 1115, the PCI bus, the HDD 1118, and the MEM-C 1117 to each other. Although not shown, the ASIC 1116 includes a PCI target and an AGP master, an arbiter (ARB) as a core of the ASIC 1116, a memory controller that controls the MEM-C 1117, a plurality of direct memory access controllers (DMAC) that perform rotation of image data or other actions by hardware logic or the like, and a PCI unit that transports data through a PCI bus between the printing unit 300 and scanner unit 200. The ASIC 1116 is connected to a FAX control unit (FCU) 1121, a universal serial bus (USB) 1122, the Institute of Electrical and Electronics Engineers 1394 (IEEE 1394) interface 1123 through the PCI bus.

The MEM-C 1117 is a local memory used as a copy image buffer and a code buffer. The HDD 1118 is a storage that stores therein image data, computer programs to control the operation of the CPU 1111, font data, and various forms.

The AGP bus 1115 is a bus interface for a graphic accelerator card proposed for accelerating graphic processes. The AGP bus 1115 accelerates the graphic accelerator card by direct access to the MEM-P 1112 in a high throughput.

A print process, which is a characteristic of a first embodiment, performed when a print function is selected is described below. The controller 1101 realizes this print function according to a computer program, which is stored in one of the above noted memory devices.

Of the various calculation processes carried out by the controller 1101 of the digital multifunction machine 1000, some processes characteristic of the present embodiment will be described below. To summarize, the processes characteristic of the present embodiment are to read a revision document 500 (see FIG. 3) via the scanner unit 200, and to read a re-positioning instruction sheet 600 (see FIG. 4) via the scanner unit 200, whereby the layout of a given document is adapted to be reset. The revision document 500 includes handwritten area instructions for a given original document, while the re-positioning instruction sheet 600 includes instructions for changing the layout.

Figure 5:
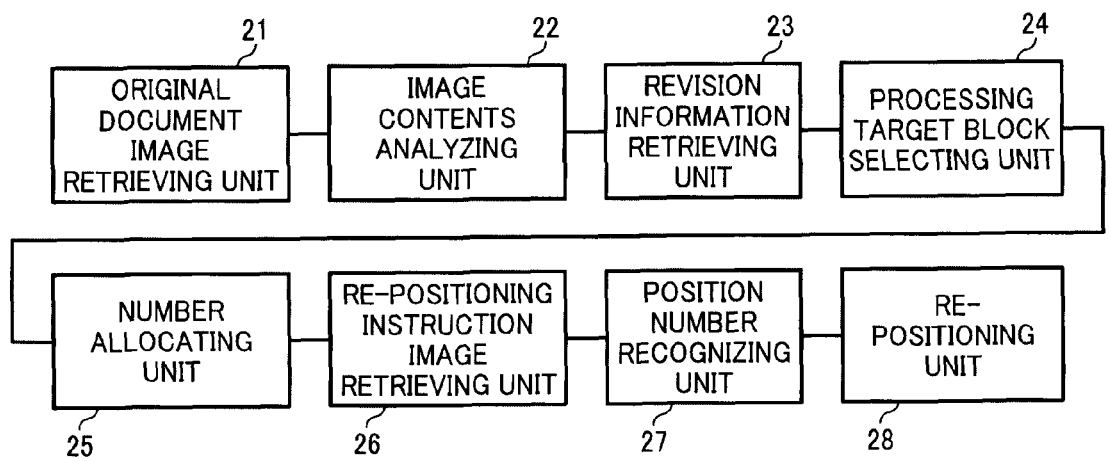
FIG. 5 is a block diagram illustrating a functional configuration associated with editing processes.
Figure 6:
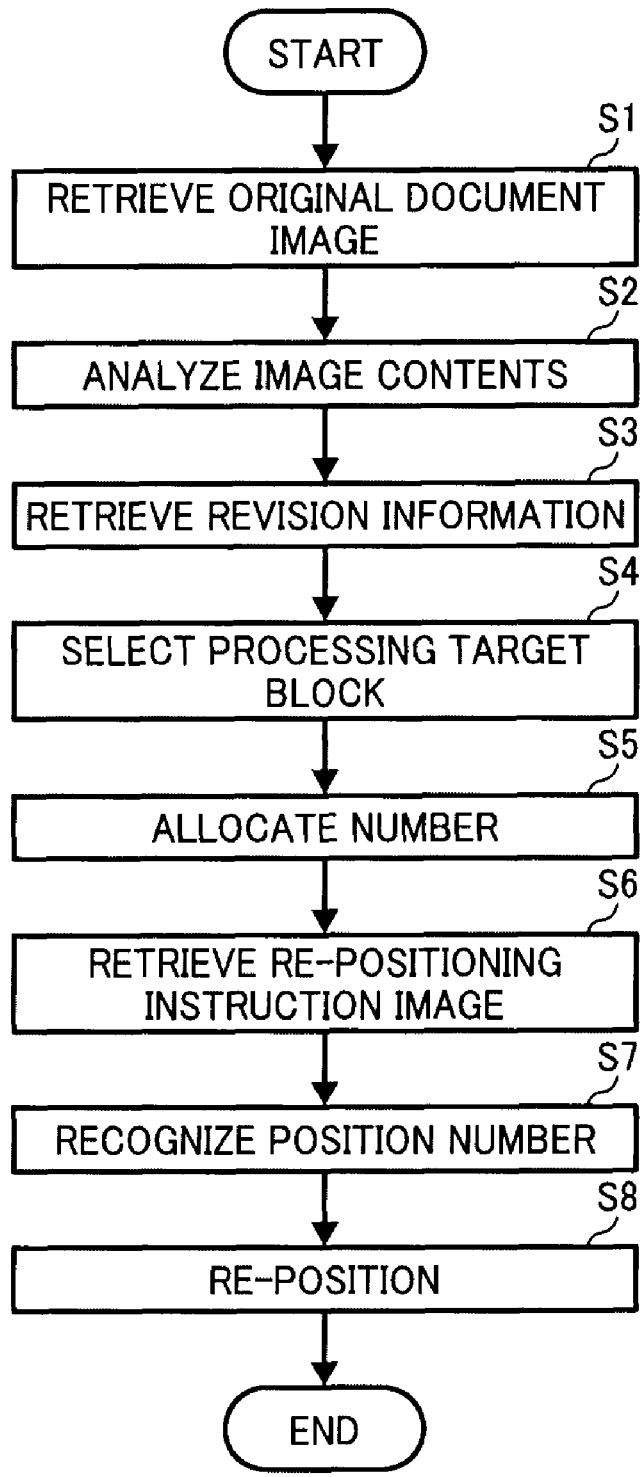
FIG. 6 is a flow diagram illustrating a flow of the editing processes.

The HDD 1118 of the digital multifunction machine 1000 stores an editing program as an application program. In particular, with the start of the editing program, the CPU 1111 of the digital multifunction machine 1000 controls the individual units according to the editing program to execute editing processes. FIG. 5 is a block diagram illustrating a functional configuration associated with the editing processes of the digital multifunction machine 1000. FIG. 6 is a flow diagram illustrating a flow of the editing processes.

As shown in FIG. 5, with the operation of the CPU 1111 according to the editing program, the digital multifunction machine 1000 realizes original document image retrieving unit 21, image contents analyzing unit 22, revision information retrieving unit 23, processing target block selecting unit 24, number allocating unit 25, re-positioning instruction image retrieving unit 26, position number recognizing unit 27 and re-positioning unit 28.

Figure 3:
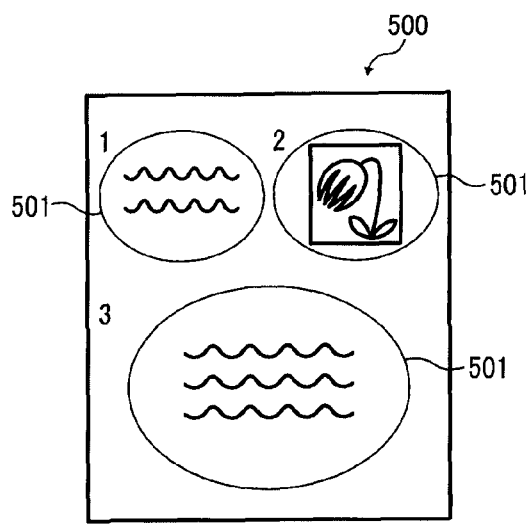
FIG. 3 is a plan view illustrating a revision document.

The original document image retrieving unit 21 operates the scanner unit 200 to read the revision document 500 shown in FIG. 3 and obtain the image information of the revision document 500 (step S1 of FIG. 6).

The revision document 500 is a document resulting from effecting a handwritten revision for area instructions to a given original document. In the case of changing the layout in the contents of original document data, revision information pieces 501 shown in FIG. 3 include closed curves (area definitions) enclosing individual blocks to be moved in the original document, and position numbers allocated to the closed curves. The position numbers allocated to the closed curves are to specify layout positions in the re-positioning instruction sheet 600 that will be described later. FIG. 3 shows a case where the original document data is divided into three blocks. Specifically, FIG. 3 shows an example where each of the three blocks is enclosed by the closed curve and each closed curve is allocated with a position number.

The image contents analyzing unit 22 analyzes the contents of the image information retrieved by the original document image retrieving unit 21 (step S2 of FIG. 6).

More specifically, the image information of the revision document 500 retrieved by the original document image retrieving unit 21 is subjected to area recognition processing to obtain a hierarchical structure of image construction blocks which define the image construction of the image information of the revision document 500. The area recognition processing includes: executing various image analyzing processes for the image information, such as an OCR process for executing optical character recognition, to calculate various image characteristic values indicating image attributes of the original document image; and then extracting the image construction blocks based on the calculated various image characteristic values. The following are some examples of the hierarchical structure in the revision document 500.

1. Classification per page
2. Classification by groups of kinds, such as by a group of drawings, a group of graphs, a group of photographs and a group of text
3. Classification by small groups, such as by paragraphs of text
4. Classification by lines of text or rows of characters The revision information retrieving unit 23 retrieves the information revised in the revision document 500, as image information (step S3 of FIG. 6). The revision information in the revision document 500 can be extracted by retrieving the difference between the image information after revision and the image information before revision. Specifically, as the revision information, the revision information retrieving unit 23 extracts the revision information pieces 501 (made up of the closed curves enclosing the individual blocks in the original document data to be moved, and the position numbers allocated to the closed curves).

The processing target block selecting unit 24 selects the image construction blocks to be processed from among the image construction blocks that have been analyzed by the image contents analyzing unit 22, based on the positions of the revision information pieces 501 on the revision document 500 (step S4 of FIG. 6).

The number allocating unit 25 allocates the position numbers contained in the revision information pieces 501 to the image construction blocks selected by the processing target block selecting unit 24 (step S5 of FIG. 6). In this case, a page number is added to each node (image construction block) in the hierarchical structure obtained by the image contents analyzing unit 22, and a classification for every page is added to the top level of the hierarchy.

Figure 4:
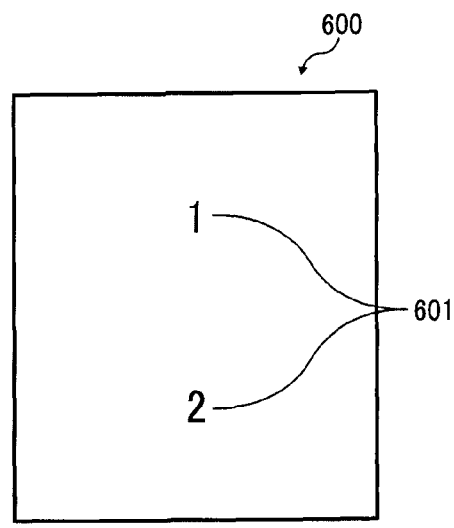
FIG. 4 is a plan view illustrating a re-positioning instruction sheet.

The re-positioning instruction image retrieving unit 26 operates the scanner unit 200 to read the re-positioning instruction sheet 600 shown in FIG. 4, and retrieves the image information of the re-positioning instruction sheet 600 (step S6 of FIG. 6).

The re-positioning instruction sheet 600 plays a role of instructing the change of layout. Position numbers 601 shown in FIG. 4 indicate the positions at which the blocks enclosed by the closed curves and allocated with the position numbers in the revision document 500 are desired to be laid out. The position numbers 601 are made up of the same numbers as the position numbers written in the revision document 500.

The position number recognizing unit 27 executes various image analyzing processes, such as an OCR process for executing optical character recognition, for the image information of the re-positioning instruction sheet 600 retrieved by the re-positioning instruction retrieving unit 26, recognizes the position numbers added as re-positioning instructions and recognizes the positions thereof, for storage as re-positioning hierarchical data (step S7 of FIG. 6). It should be appreciated that the position number recognizing unit 27 stores the results of the recognition by structuring a hierarchy with the page numbers and the position numbers for re-positioning, similar to the manner of area recognition of the revision document 500.

The re-positioning unit 28 retrieves one-page data from the re-positioning hierarchical data, and also retrieves the images corresponding to the position numbers in the one-page data from the nodes in the hierarchical structure obtained by the image contents analyzing unit 22. The re-positioning unit 28 then reads each image construction block corresponding to the position of each position number in the re-positioning instruction sheet 600, to carry out re-positioning (step S8 of FIG. 8). It should be appreciated that, here, the image data are modified to avoid overlapping, by which the image can be re-constructed.

The document whose layout has been reset as described above is printed out according to the user's instructions.

Figure 7:
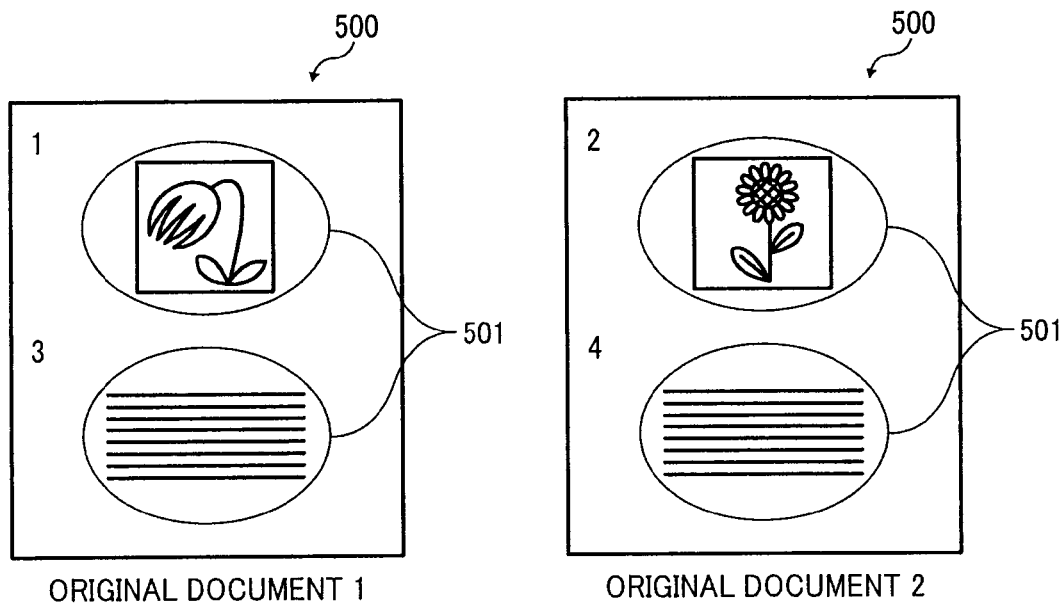
FIG. 7 is a plan view illustrating revision documents.

Hereinafter, a specific embodiment is described. As shown in FIG. 7, let us assume that there is a two-page original document containing color photographs, with the respective captions being provided below the photographs. Since such an original document is mostly used in two facing pages, the photographs and the captions are separated from each other to prepare an original document of photographs and an original document of captions.

As shown in FIG. 7, the user prepares a first page of the revision document 500 by handwriting a closed curve enclosing the photograph of an "original document 1" and handwriting a position number "1", and, similarly, handwriting a closed curve enclosing the caption of the "original document 1" and handwriting a position number "3". Also, the user prepares a second page of the revision document 500 by handwriting a closed curve enclosing the photograph of an "original document 2" and handwriting a position number "2", and, similarly, handwriting a closed curve enclosing the caption of the photograph and handwriting a position number "4". Then, the user instructs the digital multifunction machine 1000 to read the revision document 500. Thus, with the operation of the scanner unit 200, the revision documents 500 are read by the digital multifunction machine 1000.

Figure 8:
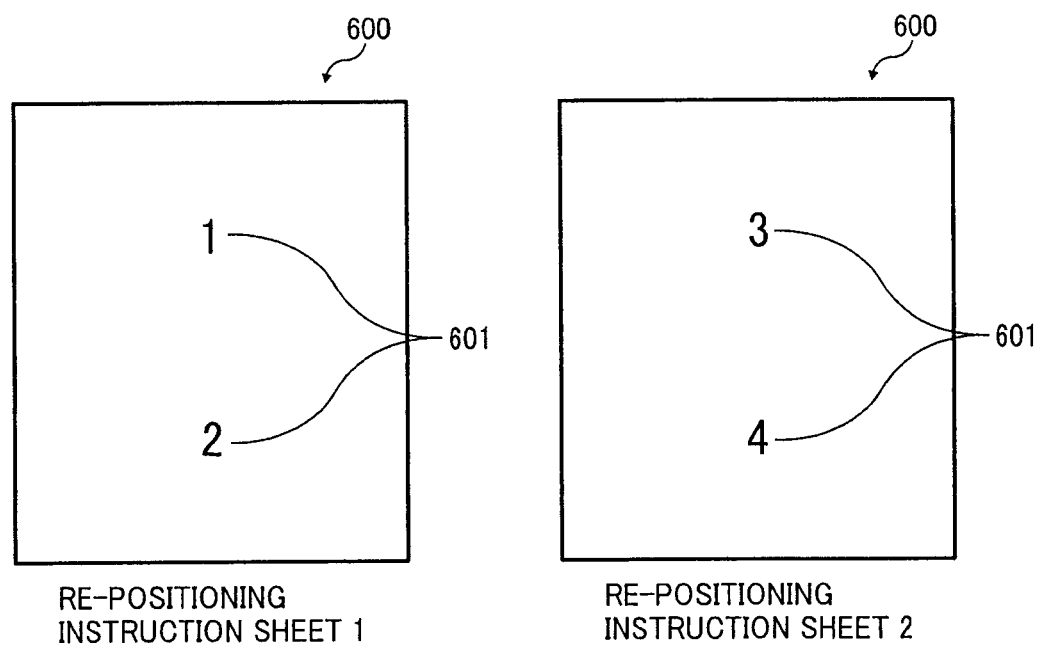
FIG. 8 is a plan view illustrating re-positioning instruction sheets.

As shown in FIG. 8, the user prepares a first page of the re-positioning instruction sheet 600 in which the position numbers "1" and "2" are handwritten. Also, the user prepares a second page of the re-positioning instruction sheet 600 in which the position numbers "3" and "4" are handwritten. Then, the user instructs the digital multifunction machine 1000 to read the re-positioning instruction sheet 600. Thus, with the operation of the scanner unit 200, the re-positioning instruction sheets 600 are read by the digital multifunction machine 1000.

Figure 9:
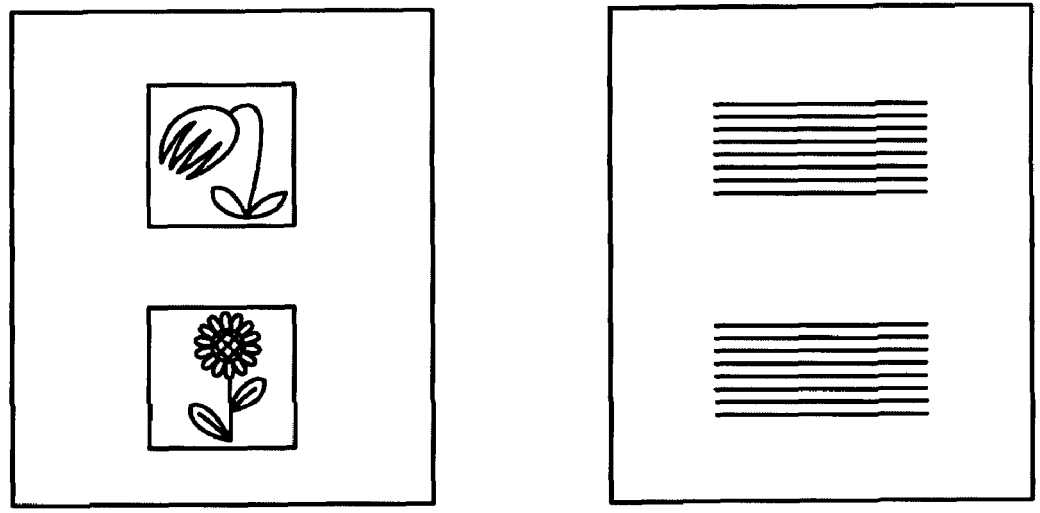
FIG. 9 is a schematic diagram illustrating an example of reset layouts.

The editing processes are carried out in the digital multifunction machine 1000 so that a document with a reset layout can be produced. In particular, as shown in FIG. 9, two color photographs are printed on a first page and the corresponding captions are collectively indicated on a second page.

If the digital multifunction machine 1000 can provide a preview, the results of the reset layout can be visually recognized before being printed out.

According to the present embodiment, the revision documents 500 have revision information including area definitions to give area instructions for the predetermined original documents and including the position numbers for the area definitions. The image construction in the image information of each of the revision documents 500 is defined by the hierarchical structure of the image construction blocks. The image construction blocks to be processed are selected based on the results of analyzing the hierarchical structure of the image construction blocks and the positions of the revision information pieces on each of the revision documents 500. Then, position numbers are allocated to the selected image construction blocks, while the position numbers and the positions thereof are recognized based on the image information of the re-positioning instruction sheets 600. Then, the image construction blocks allocated with the position numbers corresponding to the positions of the position numbers on the re-positioning instruction sheets 600 are re-positioned. Then, the revision documents 500 having revision information that includes area definitions and the position numbers thereof, as well as the re-positioning instruction sheets 600 written with the position numbers and the positions thereof, are just read using the scanner unit 200, so that the layouts can be changed between the plurality of pages.

Figure 10:
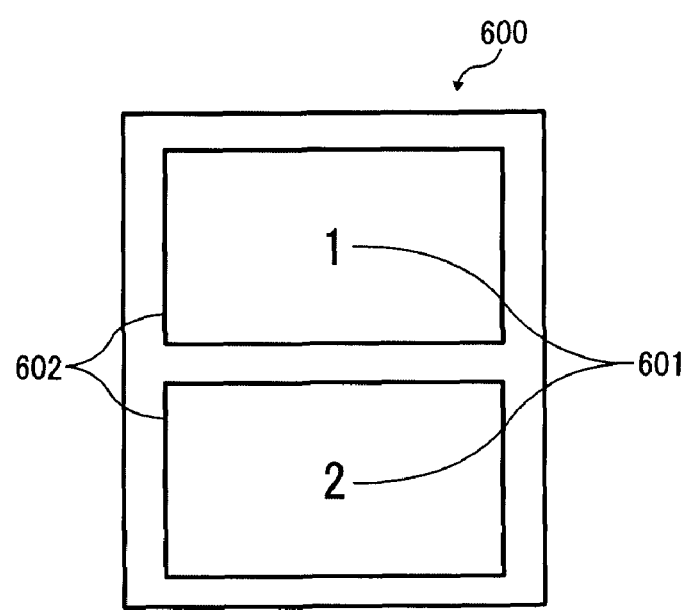
FIG. 10 is a plan view illustrating a modified example of a re-positioning instruction sheet.

The present embodiment has been configured to use the re-positioning sheets 600 added with only the position numbers 601 which are the same as the position numbers written in the revision documents 500. This is not intended to give limitation to the present invention. Frames 602 for image positioning may also be written in each re-positioning instruction sheet 600 as shown in FIG. 10.

In this case, the position number recognizing unit 27 prepares a hierarchical data for re-positioning, including not only the values for the position numbers 601 but also the position coordinates of the frames 602. Also, in this case, frame data without having position numbers are also captured into the hierarchical data, and used for providing blank areas at the time of printing.

The re-positioning unit 28 uses the frames 602 recognized by the position number recognizing unit 27 so that the image data will not be overlapped in the process at step S8 of FIG. 6. Specifically, the re-positioning unit 28 re-positions the image construction blocks that define the image construction in the image information of each revision document 500, in such a way that the image construction blocks will fit into the position coordinates of the frames 602 recognized by the position number recognizing unit 27. Also, the size of each of the corresponding image construction blocks may be adapted to be changed according to the size or area of each specified frame 602 that has been stored at the time of re-positioning.

In addition, in printing out data, the frames 602 for image positioning, which have been written into each re-positioning instruction sheet 600, may also be printed out. This may help make clear coherent groups.

In the present embodiment, the number of the revision documents 500 and the number of the re-positioning instruction sheets 600 have been identical. This however is not intended to make any limitation. The number of the revision documents 500 and the number of the re-positioning instruction sheets 600 may be differentiated.

Figure 11:
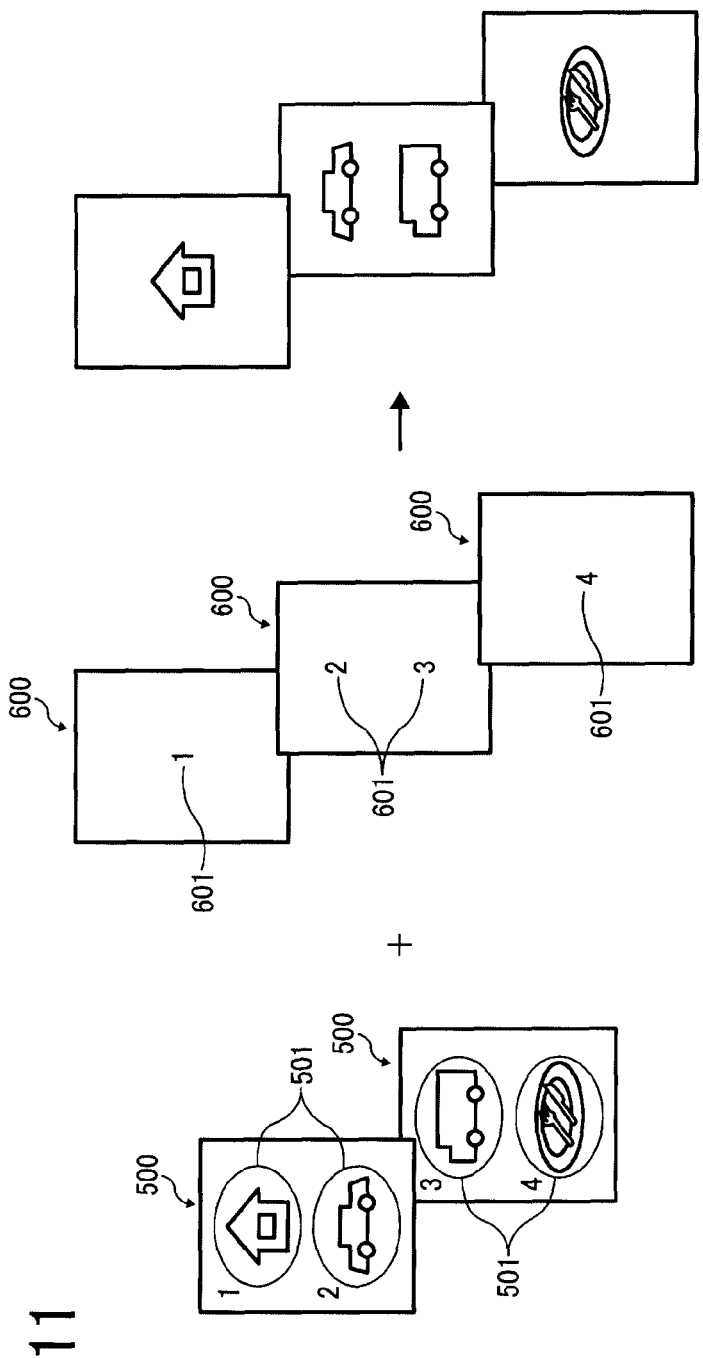
FIG. 11 is a schematic diagram illustrating a flow of resetting layouts.

For example, as shown in FIG. 11, two revision documents 500 may be prepared. In this case, the areas of the position numbers "1" and "2" may be selected in the first revision document 500 to instruct revision. Similarly, the areas of the position numbers "3" and "4" may be selected in the second revision document 500 to instruct revision. On the other hand, three re-positioning instruction sheets 600 may be used in this case, with the first sheet 600 being written with only the position number "1", the second sheet 600 being written with the position numbers "2" and "3", and the third sheet 600 being written with the position number "4". Thus, as shown in FIG. 11, the color photograph of position number "1" is laid out on the first page, the color photographs of the position numbers "2" and "3" are laid out on the second page, and the color photograph of the position number "4" is laid out on the third page.

The program executed by the digital multifunction machine 1000 of the present embodiment may be provided in the forms of computer readable recording media, such as a CD-ROM, a flexible disk (FD), a CD-R and a DVD (digital versatile disk), each of which is in a format file that can be installed and executed in the machine.

Alternatively, the program executed by the digital multifunction machine 1000 of the present embodiment may be provided by storing the program in a computer which is linked to a network, such as an internet, so that the program can be downloaded via the internet. Alternatively, the program executed by the digital multifunction machine 1000 of the present embodiment may be provided or distributed via a network, such as an internet.

Figure 12:
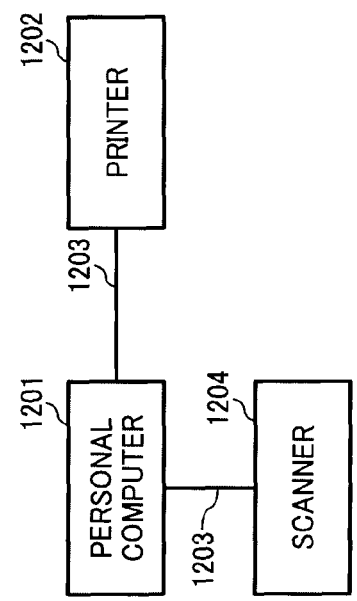
FIG. 12 is a schematic block diagram illustrating an example of a configuration of an image processing system.

In the present embodiment, the digital multifunction machine 1000 called MFP has been used as the image processor. However, this is not intended to make any limitation. For example, as shown in FIG. 12, a printer 1202 serving as an image printer, and a scanner 1204 serving as an image reader may be connected to a personal computer 1201 through a cable 1203. Meanwhile, a predetermined program may be installed in a memory device (not shown), such as an HDD, of the personal computer 1201 serving as an image processor to permit the CPU (not shown) of the personal computer 1201 to operate according to the program. In this way, the advantages similar to the various advantages described above may be enjoyed.

What is claimed is:

1. An image processing apparatus comprising:
   an image retrieving unit configured to retrieve image information of a revision document, which includes revision information having area definitions and position numbers corresponding to each of the area definitions;
   an image contents analyzing unit configured to analyze a hierarchical structure of image construction blocks that define an image construction in the image information retrieved by the image retrieving unit;

a processing target block selecting unit configured to select the image construction blocks to be processed resulting from the analysis conducted by the image contents analyzing unit, based on positions of the area definitions on the revision document;

a number allocating unit configured to allocate position numbers contained in the image information of the revision document, with respect to the image construction blocks selected by the processing target block selecting unit;

a re-positioning instruction image retrieving unit configured to retrieve image information of a re-position instruction sheet, which includes the position numbers in locations different from the locations of the area definitions corresponding to each of the position numbers of the revision document;

a position number recognizing unit configured to recognize the position numbers and positions of the position numbers in the re-positioning instruction image and position coordinates of each frame for repositioning, which are written in the re-positioning instruction sheet, as re-positioning instructions; and a re-positioning unit configured to re-position the image construction blocks in such a way that the blocks are fit into the position coordinates of each frame recognized by the position number recognizing unit.

2. An image processing method comprising:

retrieving image information of a revision document, which includes revision information having area definitions and position numbers corresponding to each of the area definitions;

analyzing a hierarchical structure of image construction blocks that define an image construction in the retrieved image information of the revision document;

selecting the image construction blocks to be processed resulting from the analyzed hierarchical structure based on positions of the area definitions on the revision document;

allocating position numbers contained in the image information, with respect to the selected image construction blocks;

retrieving image information of a re-position instruction sheet, which includes the position numbers in locations different from the locations of the area definitions corresponding to each of the position numbers of the revision document;

recognizing the position numbers and the positions of the position numbers and position coordinates of each frame for repositioning, which are written in the re-positioning instruction sheet, as re-positioning instructions, and re-positioning the image construction blocks in such a way that the blocks are fit into the position coordinates of each recognized frame.

3. A computer program product including computer program code stored on a non-transitory computer-readable recording medium which when executed on a computer cause the computer to execute the image processing method according to claim 2.

4. An image processing apparatus comprising:

means for retrieving image information of a revision document, which includes revision information having area definitions and position numbers corresponding to each of the area definitions;

means for analyzing a hierarchical structure of image construction blocks that define an image construction in the image information retrieved by the means for retrieving image information of the revision document;

means for selecting the image construction blocks to be processed resulting from the analysis conducted by the means for analyzing, based on positions of the area definitions on the revision document;

means for allocating allocate position numbers contained in the image information of the revision document, with respect to the image construction blocks selected by the means for selecting;

means for retrieving image information of a re-position instruction sheet, which includes the position numbers in locations different from the locations of the area definitions corresponding to each of the position numbers of the revision document;

means for recognizing the position numbers and the positions of the position numbers and position coordinates of each frame for repositioning, which are written in the re-positioning instruction sheet, as re-positioning instructions; and means for re-positioning the image construction blocks in such a way that the blocks are fit into the position coordinates of each frame recognized by the means for recognizing.

* * * * *